US007680060B2

(12) United States Patent  
Jennings

(10) Patent No.: US 7,680,060 B2  
(45) Date of Patent: Mar. 16, 2010

(54) TRANSFERRING STATE INFORMATION IN A NETWORK

(75) Inventor: Cullen Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1206 days.

(21) Appl. No.: 11/076,462

(22) Filed: Mar. 8, 2005

(65) Prior Publication Data

US 2006/0203979 A1  Sep. 14, 2006

(51) Int. Cl.  
*H04L 12/26* (2006.01)

(52) U.S. Cl. .................. 370/252; 370/352; 370/353; 370/354; 370/355; 370/400; 379/93.01; 379/106.01; 379/114.29; 379/221.08; 379/350; 709/201; 709/223; 709/228; 709/237; 709/246

(58) Field of Classification Search ................ 370/252, 370/351–356, 400; 379/93.01, 106.01, 114.29, 379/221.08, 229, 350; 709/201, 223, 228, 709/237, 246  
See application file for complete search history.

(56) References Cited

U.S. PATENT DOCUMENTS

| | | | | |
|---|---|---|---|---|
| 5,109,486 A * | 4/1992 | Seymour | ..................... | 709/224 |
| 5,345,589 A * | 9/1994 | King et al. | ................... | 718/100 |
| 6,532,497 B1 * | 3/2003 | Cromer et al. | .............. | 709/250 |
| 6,615,236 B2 * | 9/2003 | Donovan et al. | ............ | 709/203 |
| 6,856,618 B2 * | 2/2005 | Strathmeyer et al. | ........ | 370/356 |
| 6,963,635 B1 * | 11/2005 | Jones | .................... | 379/114.14 |
| 7,274,783 B2 * | 9/2007 | Yoakum et al. | ............. | 379/219 |
| 7,286,520 B2 * | 10/2007 | Takeda et al. | ............... | 370/349 |
| 7,353,259 B1 * | 4/2008 | Bakke et al. | ................ | 709/208 |
| 7,394,804 B2 * | 7/2008 | Miyata et al. | ............... | 370/352 |
| 7,421,478 B1 * | 9/2008 | Muchow | ..................... | 709/209 |
| 2002/0103898 A1 * | 8/2002 | Moyer et al. | ................ | 709/224 |
| 2002/0129236 A1 * | 9/2002 | Nuutinen | ..................... | 713/151 |
| 2002/0136206 A1 * | 9/2002 | Gallant et al. | ............... | 370/352 |
| 2003/0110257 A1 * | 6/2003 | Hyun et al. | ................. | 709/224 |
| 2003/0110292 A1 * | 6/2003 | Takeda et al. | ............... | 709/245 |
| 2004/0107238 A1 | 6/2004 | Orton et al. | | |
| 2004/0255039 A1 * | 12/2004 | Honeisen | ..................... | 709/230 |
| 2005/0147086 A1 * | 7/2005 | Rosenberg et al. | .......... | 370/352 |
| 2005/0251554 A1 * | 11/2005 | Fong et al. | .................. | 709/206 |
| 2006/0146792 A1 * | 7/2006 | Ramachandran et al. | .... | 370/352 |
| 2006/0248193 A1 * | 11/2006 | Elvanoglu et al. | ........... | 709/226 |
| 2007/0078999 A1 * | 4/2007 | Corson et al. | ............... | 709/230 |
| 2007/0136413 A1 * | 6/2007 | Ishikawa et al. | ............ | 709/200 |

OTHER PUBLICATIONS

Benagapalle, Zafer, entitled Session Initiation Protocol (SIP). Mar. 8, 2005.

* cited by examiner

*Primary Examiner*—Hemant Patel  
(74) *Attorney, Agent, or Firm*—Trellis IP Law Group, PC

(57) ABSTRACT

A system for storing information in a network. The system includes one or more network elements and a message adapted for transfer between the one or more network elements. A mechanism selectively augments the message with information pertaining to a state associated with the one or more network elements. In one embodiment, the system includes space within the message for accommodating one or more state vias containing the state information. One or more computers associated with the one or more network elements are adapted to update the message with state information pertaining to each of the one or more network elements that receives the message via the network.

18 Claims, 2 Drawing Sheets

TRANSFERRING STATE INFORMATION IN A NETWORK

BACKGROUND OF THE INVENTION

This invention relates in general to networks and more specifically to transfer of state information using network communications.

Networks are employed in various demanding applications including wireless communications and Voice Over Internet Protocol (VOIP) telephony. Such applications often require maintenance of status information pertaining to a particular communication session. Status information may include user billing information, call state information, network device status, and so on.

Maintenance of status information is particularly important in large network applications employing specific protocols to control message flow through the network. For example, in VOIP Internet telephony applications employing Session Initiation Protocol (SIP), users may initiate phone calls to other users. Different network devices, such as proxy servers, redirect servers, and registrars, facilitate establishing calls between one or more parties. Conventionally, each network device maintains local state information for each call or associated message-initiation sequence. Unfortunately, storage of such information at each device may require excess upkeep and memory. Storage of status information at a device can be inefficient when the device is no longer used for a call, such as when a call has been dropped, when a device malfunctions or becomes unavailable, etc.

DETAILED DESCRIPTION OF EMBODIMENTS OF THE INVENTION

A preferred embodiment of the present invention includes a special message that is adapted for transfer between one or more network elements. The embodiment further includes a system for selectively augmenting the message with information pertaining to one or more states associated with the one or more network elements. In one embodiment the state information is included in a SIP via header. The network elements may be devices, such as routers, switches, servers, client computers, SIP telephones, etc. In general, any type of hardware or software or combination thereof at one or more devices can be used with aspects of the invention. Any type of network or communication link can be used. Examples of some standard devices and networks are discussed below.

For clarity, various well-known components, such as power supplies, analog telephone adapters, gateways, the Internet, the Public Switched Telephone Network (PSTN), and so on, have been omitted from the figures. However, those skilled in the art with access to the present teachings will know which components to implement and how to implement them to meet the needs of a given application.

Figure 1:
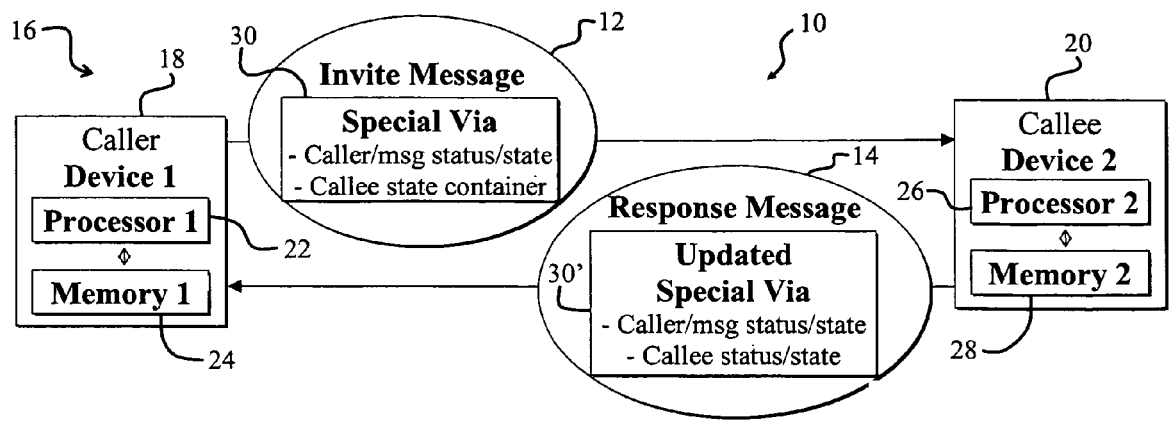
FIG. 1 is a diagram of a system for accommodating state information in a message sent over a network according to an embodiment of the present invention.

FIG. 1 is a diagram of a system 10 for accommodating state information in a message 12, 14 sent over a network 16 according to an embodiment of the present invention. The system 10 is implemented via the network 16, which includes a first device 18 in communication with a second device 20. The first device 18 includes an accompanying first processor 22, which communicates with an accompanying first memory 24. Similarly, the second device 20 includes an accompanying second processor 26 in communication with a second memory 28. The first and second memories 24, 28 are computer-readable or processor-readable mediums. The network devices 18, 20 are adapted to transfer special messages 12, 14, which include a special invite message 12 and a special response message 14 over the network 16.

In the present specific embodiment, the invite message 12 includes a special via 30, which acts as a storage mechanism that maintains additional information, such as status information pertaining to the status of the first device 18. The response message 14 includes an updated special via 30', which also maintains additional information, such as updated status information pertaining to the status of the second device 20.

In an exemplary operating scenario, the first device 18 represents a device employed by a caller wishing to establish a connection, such as a phone call, with the second device 20, which represents a device employed by a callee. The caller device 18 maintains instructions stored in the first memory 24, which are selectively executed by the first processor 22 to generate the special invite message 12. The special invite message 12 contains a special via, which optionally indicates the current state of the call and further includes state information pertaining to caller device 18. The state information pertaining to the caller device 18 may include additional information, such as billing information, which may include the address of the user and the time that the call was placed. State information may also include current operational state of the caller device 18. If the caller device 18 implements one or more state machines, states associated with the state machines may be stored in the special via 30 of the invite message 12. For the purposes of the present discussion, a state machine is any circuit, software code, or other device that cycles through various operational states to perform a desired function.

In the present specific embodiment, the special via 30 includes a callee state container field, which acts as a request by the caller device 18 for state information from the callee device 20. Upon receipt of the invite message 12, the callee device 20 accesses the special via 30 and fills the callee state container with the callee state information indicated by the caller device 20 in the special via 30.

This additional callee status or state information contained in the updated special via 30' may be encrypted by the caller device 18, via encryption instructions stored on the second memory 28 and executed by the second processor 26, or the callee device 20, via encryption instruction stored in the first memory 24 and executed by the first processor 22. Encryption may be performed via a key known to the caller device 18 and/or the callee device 20. Those skilled in the art with access to the present teachings will know how to appropriately encrypt fields, such as fields within the updated special via 30', without undue experimentation.

In an illustrative embodiment, the network 16 employs SIP to establish a connection between the caller device 18 and the callee device 20. The invite message 12 and associated response message 14 are formatted in accordance with the SIP invite method. For example, the additional information stored in the special vias 30, 30', exhibit Uniform Resource Locator (URL) or Uniform Resource Identifier (URI) format. SIP message formatting is discussed more fully in Internet Engineering Task Force (IETF) Request For Comment (RFC) document numbers 2543 and 3261.

As a more specific example of the operation of the system 10 and the formatting of accompanying messages 12, 14, the caller device 18 sends the invite message 12 with the special via 30 containing the via field a.example.com followed by the via field <state>.shadow.a.example.com. The <state> of <state>.shadow.a.example.com field represents an encoded version of the state that the caller device 18 wishes to obtain from the callee device 20. Encoding may be performed via various encoding techniques, such as base-64 encoding. The encoding may be protected via an additional encryption key.

Upon receipt of the special via 30 containing the <state>.shadow.a.example.com field, the callee device 20 employs the second processor 26 and memory 28 to insert state information indicated by the <state> portion of the <state>.shadow.a.example.com via field into the <state> portion of the <state>.shadow.a.example.com via field and returns the updated field to the caller device 18 in the updated special via 30' of the response message 14.

When the caller device 18 receives the response message 14 from the callee device 20, the caller device 18 employs the first processor 22 and memory 24 to examine the second via field, i.e., <state>.shadow.a.example.com, with knowledge that the portion of the field preceding shadow.a.example.com represents the desired state retrieved from the callee device 20.

Hence, the system 50 also implements a method for storing and manipulating information that includes the step of inserting a state-information request as a field (<state>) in a message 12 and then receiving a response 14 from a second network entity, such as the callee device 20. The response provides the state information requested in the special via field (<state>) of the initial message 12. The callee device 20 may be implemented as another type of network element, such as a server employing SIP signaling, without departing from the scope of the present invention, as discussed more fully below.

The SIP via mechanism, partially represented by the special SIP via field 30, facilitates adding additional information to communication-system messages, such as Voice Over Internet Protocol (VOIP) connection messages. The message 12 with the accompanying special via 30 is passed along to subsequent elements, such as the caller device 20. Additional network elements or nodes may be included between the caller device 28 and the callee device 18 in the forward communication link from the caller device 18 to the callee device 20 and/or in the reverse communication link from the callee device 20 to the caller device 18, as discussed more fully below.

Each element can add an additional via or add additional information to an existing via, which is accessible by the network element that added the additional information. In accordance with the present embodiment, each network element or node that implements a state machine pertaining to a given message session employs one or messages of the communication session to store states required to implement the state machines.

As a message 12, 14, with accompanying special via 30, 30' passes backward, i.e., along a reverse link through the establishing chain of network elements, each element that added state information to a special via can access the state information as needed to facilitate implementing one or more state machines required to facilitate establishment or maintenance of a communication session.

Use of the special SIP vias 30 is particularly useful when returning messages do not pass back through originating elements, such as when one or more of the originating elements have become unavailable. Furthermore, little or no state-information memory resources are required at the elements (although local storage of state information can still be employed if desired), so that these resources can be used for other tasks.

Figure 2:
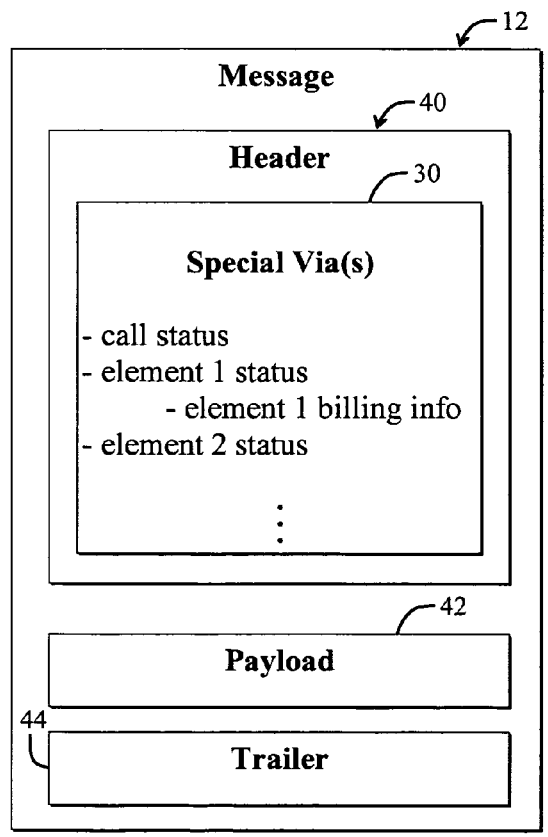
FIG. 2 is a more detailed diagram of a message adapted for use with the system of FIG. 1.

FIG. 2 is a more detailed diagram of an exemplary message 12 adapted for use with the system 10 of FIG. 1. The message 12 incorporates the special via 30, which may be implemented via plural vias without departing from the scope of the present invention. In the present specific embodiment, the special via 30 is incorporated within a message header 40 and acts as a SIP record with plural SIP via fields, called state vias in the present embodiment. The special via 30 includes various types of additional information for various elements in a network, such as the network 16 of FIG. 1. For illustrative purposes, the special via 30 is shown including call status or state information pertaining to a call associated with the message 12; status or state information pertaining to a first network element, such as the caller device 18 of FIG. 1; and status or state information pertaining to a second network element, such as the callee device 20 of FIG. 1. Note that the status or state information associated with the first element includes billing information associated with the first element. The billing information may include timing information associated with the call or communication session that is associated with the message 12 and/or address information associated with the user of the first element. The terms status and state are employed interchangeably.

For the purposes of the present discussion, an element is any device, node, or other entity that is functions in support of or as part of a network. A network is any collection of interconnected elements. Network elements may be connected in various ways, including wirelessly, acoustically, electronically, and/or photonically.

In the present specific embodiment, the message 12 includes payload data 42, containing additional message contents, such as voice information. The message 12 also includes a trailer 44, which indicates the end of the message 12 and which may include error detecting and or correcting mechanisms, such as Cyclic Redundancy Check (CRC) bits. In this embodiment, the message 12 is implemented as a packet, such as a Universal Datagram Protocol (UDP) packet, which is adapted for sending over various packet-switched networks, such as the Internet.

The message 12 may be implemented via mechanisms and/or formats other than packets or datagrams without departing from the scope of the present invention. For example, the message 12 may be broken into several packets.

Figure 3:
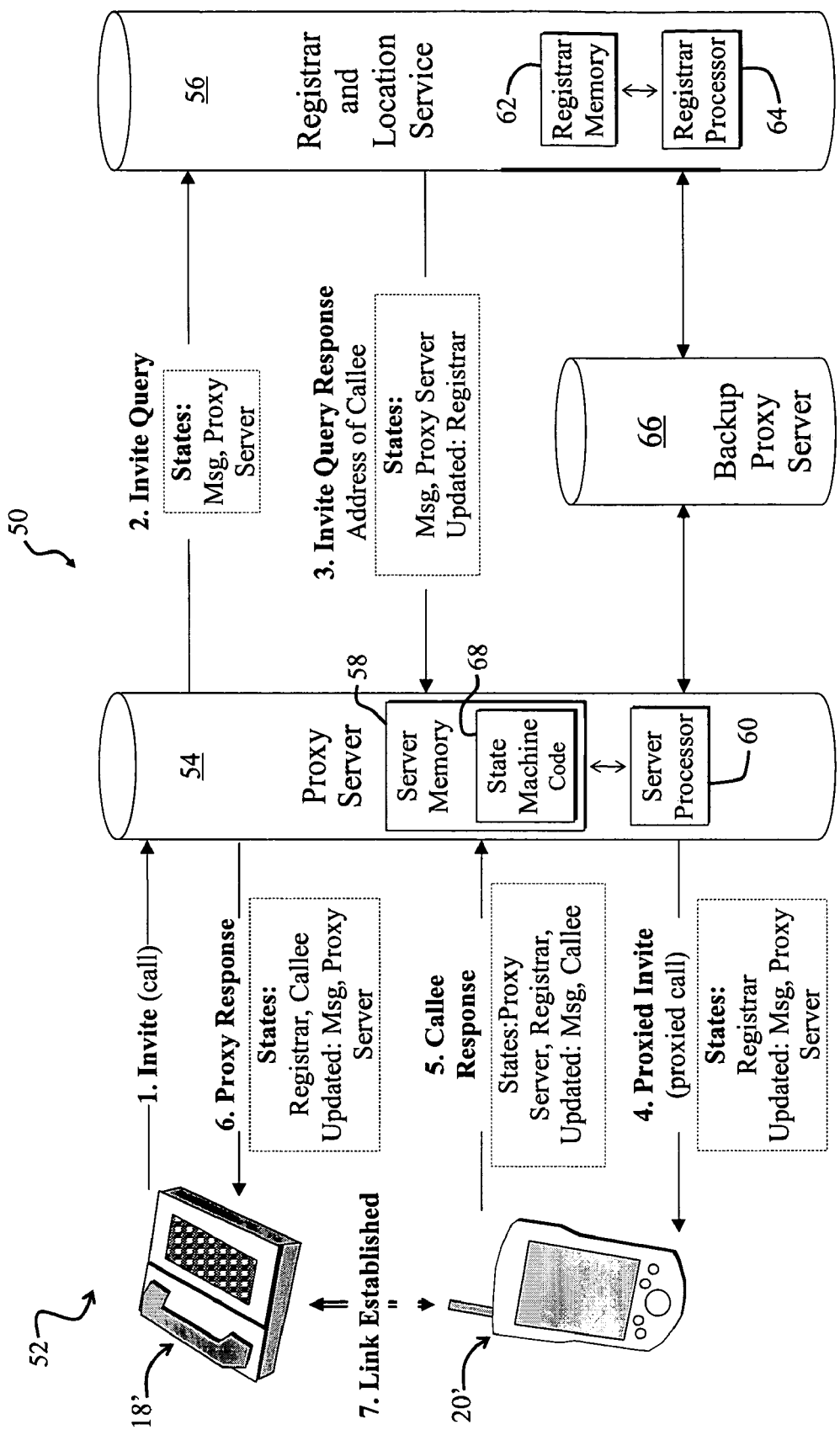
FIG. 3 is a diagram illustrating an illustrative embodiment of a system for accommodating state information in a network employing Session Initiation Protocol (SIP).

FIG. 3 is a diagram of an illustrative embodiment of a system 50 for accommodating state information in a network 52 employing SIP. The system 50 is implemented via the network 52. The network 52 may be part of a larger network, such as the Internet. However, only certain elements of the network 52 are shown to provide an example of the operation of the system 50 in an exemplary scenario.

In the present scenario, the network 52 is shown to include a SIP caller device 18', which is implemented as a SIP phone 18' for exemplary purposes. The SIP phone 18' acts as a SIP client and may be implemented via a soft client, multimedia handset, or other device without departing from the scope of the present invention.

The SIP phone 18' incorporates one or more computers and an Analog Telephone Adapter (ATA) adapted to connect a SIP phone to a proxy server 54. The exemplary SIP proxy server 54 communicates with a registrar and location service 56 and a callee device 20'. In the present embodiment, the proxy server 54 and registrar and location service 56 are implemented via computers, but they may be replaced with other types of network elements without departing from the scope of the present invention. Furthermore, additional or fewer network elements may be employed. For example, a redirect server (not shown) may be employed by the proxy server 54 to facilitate communications across domains.

In operation, the network 52 employs a series of messages 1-6 between elements 18', 54, 56, 20' of the network 52 to facilitate establishing a call, i.e., initiating a session. One or more of the various messages 1-6 include special SIP vias for maintaining state information. The SIP vias are selectively accessible by various network elements 18', 54, 56, 20' during call setup. The network elements 18', 54, 56, 20' include software and/or hardware capable of selectively accessing the special via sections of the messages 1-6. Those skilled in the art with access to the present teachings may readily implement the requisite software and/or hardware to implement and access special SIP vias to meet the needs of a given implementation without undue experimentation.

The exemplary operating scenario implemented by the system 50 involves the user of the caller device 18' placing a call via the caller device 18'. When placing the call, the caller device 18' forwards an invite request to the proxy server 54 via a first SIP message 1. Subsequently, the proxy server 54 forwards an invite query 2 to the registrar and location service 56. In the present embodiment, the invite query 2 includes message state and proxy server state information, which has been incorporated into the invite query 2 via the proxy server 54. The proxy server 54 includes a server memory 58 and accompanying processor 60 for executing instructions stored in the memory 58 for updating and selectively accessing special via fields associated with the messages 1-6 handled thereby. State information may be omitted from the invite query 2 without departing from the scope of the present invention.

Subsequently, the registrar and location service 56 employs special instructions stored in a registrar memory 62 and executed by a registrar processor 64 to provide an invite query response 3 that has been updated with registrar state information and the address of the callee device 20'. The invite query response 3 is forwarded from the registrar and location service 56 to the proxy server 54.

In response to receipt of the invite query response 3 from the registrar and location service 56, the proxy server forwards a proxied invite message 4 to the callee device 20', which is a SIP-enabled multimedia handset in the present illustrative embodiment. Before transferring the proxied invite message 4 to the callee device 20', the proxy server 54 accesses the relevant server state information in the received invite query response message 3 and then incorporates updated state information into the special via record of the proxied invite message 4 as needed. This updated state information may include proxy server state information required to implement one more state machines associated with the current call. The state machines may be implemented by state machine instructions 68 stored in the server memory 58 and executed by the server processor 60. Unlike existing or conventional state machine implementations, state information required for state machine operation in the present embodiment is stored in the special vias of associated messages, such as the messages 1-6.

Hence, the system 50 also implements a method for reducing requisite memory resources for one or more elements 18', 20', 54, 56 of the network 52. The method includes implementing state machines associated with the one or more elements 18, 20 by storing states required to implement the state machines in one or more messages transferred between the one or more elements of the network 52.

Subsequently, the callee device 20' receives the proxied invite message 4 and adds status information pertaining to the status of the callee device 20' as a special via field in a special via record of a callee response message 5. The callee response message 5 also includes state information pertaining to other network elements involved in the current call. For example, the callee response message 5 also includes state information pertaining to the state of the proxy server 54 that was previously included in the proxied invite message 4 from the proxy server 54.

The callee response message 5 is forwarded from the callee device 20' to the proxy server 54. The proxy server 54 then selectively accesses and modifies requisite call and/or proxy server state information in the callee response message 5 and forwards a corresponding proxy response message 6 in response thereto to the caller device 18'.

Subsequently, the caller device 18' selectively accesses state information in the special via of the proxy response 6 and other information in preparation for establishing a communication link 7 between the caller 18' and callee 20'. In the present embodiment, the communication link 7 between the caller device 18' and the callee device 20' is a Real-time Transfer Protocol (RTP) link.

Access to various fields in the special via records of the messages 1-6 may be selectively controlled, such as by encryption by those devices or network elements that inserted the fields in the special via records of the message headers. The messages 1, 4, 5, 6 between the proxy server 54 and the SIP devices 18', 20' represent SIP signaling, while the messages 2,3 between the proxy server 54 and the registrar and location service 56 represent database query signaling.

Maintaining state information pertaining to a communication session in messages associated with the communication session ensures that the state information is maintained only as long as is necessary. The state information is said to be fate shared with the communication session. This eliminates additional resources that would otherwise be employed by network elements to store call state information when the information is no longer needed, such as when the call is dropped. Furthermore, selectively storing requisite state information in the session messages themselves, enables different network elements to be efficiently employed for a message return path, i.e., reverse link. Conventionally, state information was stored at each element in a forward link path from a caller device 18 to a callee device 20. Reverse link messages had to pass through the same elements employed in the forward link to take advantage of state information stored at those elements. Those skilled in the art will appreciate that fate sharing state information with the message session itself facilitates highly reliable and scalable communications systems.

The system 50 also implements a method for compensating for one or more failed elements in the network 52. The method includes the step of storing state information for each element through which a message of the network 52 passes during a forward link and employing the state information to enable a second element, such as the backup proxy server 66 to perform tasks that would have been performed by a first element, such as the proxy server 54. The tasks to be performed are associated with the message and performed during a reverse link. The step of storing state information involves storing the state information in the special SIP via fields of the messages 1-6 as needed in case the proxy server 54 becomes unavailable.

Hence, with reference to FIGS. 1 and 3, the embodiments 10 and 50, respectively, each represent a system for accommodating information associated with a message sent over a network. that includes mechanisms, such as the caller devices 18, 18' for generating and transmitting one or more messages via a network. The systems 10, 50 also include mechanisms, such as memories processors, for adding additional information to the one or more messages 1-6, 12 and transmitting one or more corresponding updated messages 2-6, 14 in response thereto over the network 16, 52.

In the present specific embodiments, the additional information includes state information associated with the one or more messages 1-6, 12 or updated messages 2-6, 14. The state information may include billing information; the state or status of a call or sequence of messages associated with the state; state information associated with the entity 20, 20', 54, 56 updating the information; information specifying a time at which the entity 20, 20', 54, 56 updating the information received the message(s), and so on. The state information may be encrypted by the entity 20, 20', 54, 56 updating the information.

For the purposes of the present discussion, state information is taken to include any additional information, besides server name or identification information, that specifies the condition or status of any entity involved in network operations, including a network message, network element, user account, and so on.

Variations and embodiments other than those discussed herein are possible. For example, embodiments employing the Internet or other packet switched networks; embodiments employing protocols other than SIP, and embodiments employing video calls, file transfers, conference calls, and so on are possible.

Although the invention has been discussed with respect to specific embodiments thereof, these embodiments are merely illustrative, and not restrictive, of the invention. For example, although specific protocols have been used to describe embodiments, other embodiments can use other transmission protocols or standards. Use of the terms "client" and "server" can include any type of device, operation or other process. The present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for transferring state information in a network transmission, the method executing in a sending device coupled to a network, the method comprising:
    creating a message adapted for transfer to a receiving device, wherein the message includes a via;
    storing state information about a process in the sending device in the via;
    sending the message to the receiving device;
    receiving a message from an external device, wherein the received message includes a via having state information;
    adding information to the via in the received message, wherein the added information includes information about a process in the sending device; and
    sending the received message to an external device.

2. The method of claim 1, wherein multiple processing devices are coupled by the network, the method further comprising:
    using a plurality of devices to add successive device state information to a particular via in a particular message;
    receiving the particular message back at one of the plurality of devices; and
    obtaining state information particular to the receiving device from the particular via.

3. The method of claim 1, further comprising using the message to establish a voice communication.

4. The method of claim 3, wherein the step of storing state information comprises including information about a current state of a message sequence.

5. The method of claim 3, wherein the step of storing state information comprises including billing information associated with the voice communication.

6. The method of claim 1, wherein the message is in accordance with Session Initiation Protocol (SIP).

7. The method of claim 6, wherein a SIP via is used.

8. The method of claim 7, wherein the SIP via is included in a header of the message.

9. The method of claim 1, wherein a Uniform Resource Locator (URL) is included in the via.

10. The method of claim 1, wherein a Uniform Resource Identifier (URI) is included in the via.

11. The method of claim 1, wherein multiple vias are used.

12. The method of claim 1, wherein at least a portion of the state information is encrypted.

13. An apparatus for transferring state information in a network transmission, the apparatus comprising:
    a sending device coupled to a network:
    a tangible computer-readable storage medium including instructions executable by a processor at the sending device, the tangible computer-readable storage medium including instructions for:
    creating a message adapted for transfer to a receiving device, wherein the message includes a via;
    storing state information about a process in the sending device in the via;
    sending the message to the receiving device;
    receiving a message from an external device, wherein the received message includes a via having state information;
    adding information to the via in the received message, wherein the added information includes information about a process in the sending device; and
    sending the received message to an external device.

14. The apparatus of claim 13, further comprising:
    multiple processing devices coupled by the network;
    wherein the tangible computer-readable storage medium further includes instructions for:
    using a plurality of devices to add successive device state information to a particular via in a particular message;
    receiving the particular message back at one of the plurality of devices; and
    obtaining state information particular to the receiving device from the particular via.

15. A tangible computer-readable storage medium including instructions for transferring state information in a network transmission from a sending device, the tangible computer-readable storage medium comprising instructions for:
    creating a message adapted for transfer to a receiving device, wherein the message includes a via;
    storing state information about a process in the sending device in the via;
    sending the message to the receiving device;
    receiving a message from an external device, wherein the received message includes a via having state information;
    adding information to the via in the received message, wherein the added information includes information about a process in the sending device; and
    sending the received message to an external device.

16. The tangible computer-readable storage medium of claim 15, wherein multiple processing devices coupled by the network, the tangible computer-readable storage medium further comprising instructions for:
    using a plurality of devices to add successive device state information to a particular via in a particular message;

receiving the particular message back at one of the plurality of devices; and obtaining state information particular to the receiving device from the particular via.

17. An apparatus for transferring state information in a network transmission, the apparatus comprising:

a sending device coupled to a network:

means for creating a message adapted for transfer to a receiving device, wherein the message includes a via;

means for storing state information about a process in the sending device in the via;

means for sending the message to the receiving device;

means for receiving a message from an external device, wherein the received message includes a via having state information;

means for adding information to the via in the received message, wherein the added information includes information about a process in the sending device; and means for sending the received message to an external device.

18. The apparatus of claim 17, wherein multiple processing devices are coupled by the network, the apparatus further comprising:

means for using a plurality of devices to add successive device state information to a particular via in a particular message;

means for receiving the particular message back at one of the plurality of devices; and means for obtaining state information particular to the receiving device from the particular via.

\* \* \* \* \*